United States Patent [19]  [11] 4,137,887
Dunn  [45] Feb. 6, 1979

[54] PISTONS FOR INTERNAL COMBUSTION ENGINES

[75] Inventor: Stephen J. Dunn, Peterborough, England

[73] Assignee: Perkins Engines Limited, London, England

[21] Appl. No.: 804,118

[22] Filed: Jun. 6, 1977

[30] Foreign Application Priority Data

Jun. 11, 1976 [GB] United Kingdom ............... 24213/76
Aug. 19, 1976 [GB] United Kingdom ............... 34565/76

[51] Int. Cl.² ............................................. F02F 3/08
[52] U.S. Cl. ........................... 123/193 P; 123/191 SP
[58] Field of Search ....... 123/193 P, 193 CP, 191 SP, 123/191 S, 32 C, 32 AA

[56] References Cited

U.S. PATENT DOCUMENTS 1,946,081  2/1934  Koch .......................... 123/193 P
3,075,817  1/1963  Mayes ......................... 123/193 P
3,251,349  5/1966  Isley .......................... 123/139 P

FOREIGN PATENT DOCUMENTS 2136594  2/1972  Fed. Rep. of Germany ....... 123/193 P
2108288  8/1972  Fed. Rep. of Germany ....... 123/193 P
2248008  9/1972  Fed. Rep. of Germany ....... 123/193 P
2211690  9/1973  Fed. Rep. of Germany ....... 123/193 P Primary Examiner—Ronald H. Lazarus
Attorney, Agent, or Firm—William R. Nolte

[57] ABSTRACT

A method of manufacturing a piston for an internal combustion engine in which a cast-in insert comprising a combustion chamber lip and a piston ring carrier joined by radial limbs is secured against loosening in service by spraying metal or cermet into a peripheral groove partially in the ring carrier and partially in the piston body a band firmly bonded to the carrier and the body. The carrier may be castellated to interlock with the piston material.

7 Claims, 5 Drawing Figures

PISTONS FOR INTERNAL COMBUSTION ENGINES

This invention relates to pistons for internal combustion engines and more particularly to pistons having an armoured lip on a combustion chamber in the crown of the piston.

Such pistons are usually aluminium-silicon alloy castings and because of the arduous conditions of service, it has been proposed to provide an insert of another resistant metal located at the lip of a combustion chamber formed in the crown of the piston to resist cracking.

One of the difficulties associated with such a proposal is that of loosening of the insert in service due to aluminium's low strength and tendency to creep at high temperatures, thermal cycling, inertia effects and mechanical flexing of the piston over the gudgeon pin. Among the proposals for overcoming these difficulties are an insert for the lip armour provided with limbs anchored in the body piston and an insert provided with limbs connected to an outer concentric ring located in the wall of the piston at a sealing ring groove, the groove being formed in the ring. The inserts particularly favoured are of copper base alloy because of high thermal conductivity, but a problem with such inserts is that of producing a good bond between the copper alloy and the aluminium silicon alloy.

According to the present invention there is provided a method of manufacturing a piston for an internal combustion engine comprising casting a piston body of a first metal having a cylindrical wall and incorporating during casting an armouring insert, the insert including an outer annular portion of a second metal located in the wall at or adjacent the site of a sealing ring groove, wherein the method includes the steps of forming at or adjacent the site an annular recess partially in the wall and partially in the annular portion of the insert to expose areas of first and second metals in juxtaposition and spraying metal and/or cermet on to the exposed areas of first and second metals to form a band of metal and/or cermet bonded to the juxtaposed areas.

Also according to the invention, the exposed areas may be in the form of continuous rings of first and second metals in side by side relationship extending circumferentially around the wall of the piston, or the areas may be a series of separate abutting areas alternately of first and second metals extending circumferentially around the wall of the piston. The insert for providing continuous rings of first and second metals has an outer annular portion having a continuous outer edge whereas the insert for providing the separate areas has spaced recesses in the outer edge of the annular portion, these recesses being filled during the casting operation with the piston body metal, i.e. the first metal. The insert may be formed with the lip armour and outer annular portion integrally connected by radial limbs or may be fabricated, for example, by brazing together these components, in which case other metals may be present in the insert, and, furthermore, the lip armour and outer annular portion may, if desired, be of different metals.

A preferred construction of the insert comprises an inner ring of a suitable copper alloy, which provides an armoured lip for the combustion chamber, and the inner ring is connected by radial limbs to an outer ring of a suitable ferrous alloy. The limbs may in this construction be integral with either the inner or the outer ring or may be foreshortened limbs integrally formed on both rings and joined together. The assembly is joined together by brazing. Suitable copper alloys are: copper - 0.5% beryllium - 2.5% cobalt, copper 2% nickel, and copper - 8% aluminium, and the preferred ferrous alloy is a nickel cast iron which contains as alloying elements 3% carbon - 14% nickel - 7% copper and 3% cobalt, available commercially as NIRESIST (Registered Trade Mark). The ferrous alloy selected should have a similar coefficient of thermal expansion to the low thermal expansion aluminium alloy used for the piston body, for example, the well known 18-8 stainless steels.

The annular recess is conveniently machined in the wall of the piston to intersect an interface between piston body and insert and preferably is of a V-shape. The sealing ring groove can be simultaneously formed at the bottom of the V. The recess is preferably located symmetrically about the median plane of the sealing groove, but if desired the recess may be located to expose continuous rings of first and second metals on one side only of the median plane, rather than two pairs of such continuous rings, one pair on each side of the median plane. A similar arrangement can be applied to expose alternate areas of first and second metals on one side of the groove. Alternatively, the annular recess can be located to be clear of the sealing ring groove, that is, on the side of the insert away from the groove.

Metal spraying or cermet spraying is carried out using one of the conventional techniques and a band of the sprayed material is built up on the exposed area preferably until the band is proud of the surface of the wall of the piston, a subsequent machining operation rendering the band flush with the surface and forming or sizing the sealing ring groove. Prior to this machining step, it is possible to subject the band to such processes as peening to consolidate or strengthen the spray material, if desired.

The preferred metal for spraying is stainless steel and a second choice is a mixture of stainless steel and copper. The latter mixture is obtained by using two wires, one of stainless steel, the other of copper, in a wire-fed spray pistol. Several passes may be needed to obtain the desired thickness of deposit.

The method according to the invention can be varied to produce particular results. For example, other mixtures of different metals may be selected or more than one metal may be sprayed in turn to form layers having different properties, as might be required if diffusion by heat treatment were intended at the interface between insert, piston body, and band of metal and/or cermet.

Whilst a machining operation to form the annular recess is believed to be the best method of providing exposed areas of first and second metals, it is possible to arrange for the annular recess and exposed areas to be formed during the casting operation although a cleaning e.g. shot blasting, operation may then be necessary for the exposed areas before spraying.

The present invention is particularly suitable for securing lip armour to the piston body at an area away from the crown, though of course, it is also applicable to an insert for armouring the sealing ring groove only, without lip armour, if such an arrangement were required. Where the insert is provided with recesses around the outer circumference, such recesses may be rectilinear or trapezoidal in shape or otherwise angled to provide an interlocking or dovetailing effect with the piston body. Thus, it is possible to secure the insert not only by the metallurgical bonding effect of the sprayed metal band but also by the mechanical keying effect of the recesses around the edge of the insert.

The method according to the invention provides a piston comprising a piston body of a first metal having a crown and a cylindrical wall, an insert of a second metal embedded in the body for armouring a combustion chamber in the crown, the insert including an outer annular portion located concentrically at or adjacent to a sealing ring groove in the wall, and a band of sprayed metal and/or cermet extending circumferentially and bonded to the outer annular portion of the insert and to an adjacent portion of the piston body.

Two embodiments of the invention will now be described by way of example and are illustrated in the drawings accompanying the specification.

Figure 1:
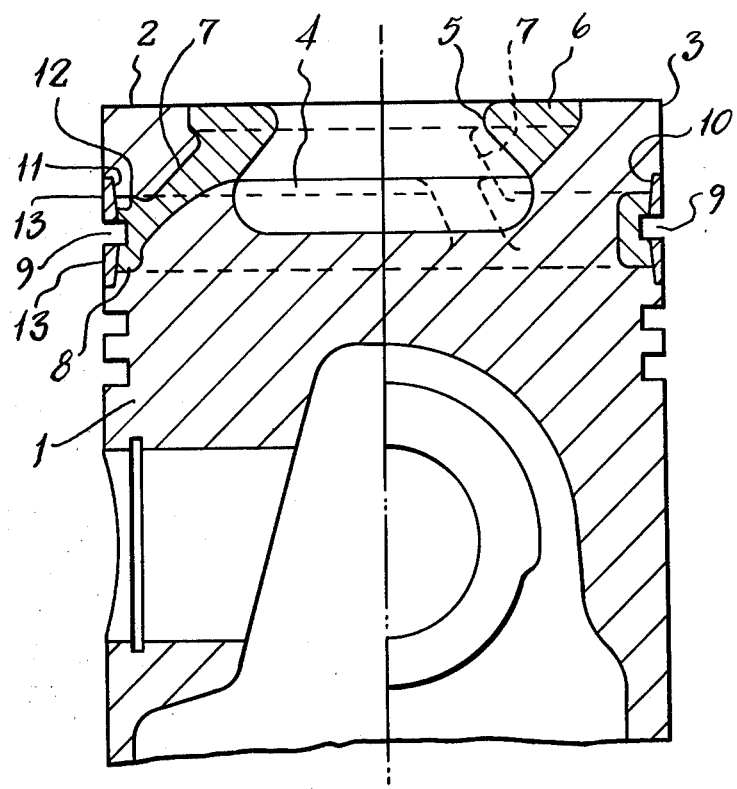
FIG. 1 represents a cross-sectional elevation along planes intersecting at right angles at the axis of a piston made in accordance with the first embodiment.

Referring to FIG. 1 an aluminium silicon alloy piston body 1 of cylindrical shape having a crown 2 and a wall 3 has formed in the crown 2 a combustion chamber 4. The armoured lip 5 of the combustion chamber 4 is provided by an insert 6 which comprises a copper alloy ring joined by brazing to three equally spaced limbs 7 integral with a nickel cast iron (NIRESIST) annular portion 8 which is located at the sealing ring groove 9 in the wall 3.

After casting the piston body 1 with the insert 6 embedded therein, a shallow V recess 10 and the groove 9 are machined, the recess 10 extending through annular portion 8 and into the piston body on either side of the groove 9, thus exposing side by side rings of aluminium alloy 11 and nickel cast iron 12.

The recess 9 is then sprayed with stainless steel from a conventional appliance to form a band 13 of deposited metal bonding to the whole surface of the recess 9 and therefore to the rings 11 and 12 of exposed aluminium alloy and nickel cast iron, whereby the insert 6 is secured to the body 1. The band 13 and the groove 9 are then finally machined, thereby producing the upper and lower parts of the band 13 shown in FIG. 1.

In the second embodiment as shown in FIGS. 2, 3, 4 and 5, a piston body 1 of cylindrical shape having a crown 2 and a wall 3 has embedded therein an insert 6 which includes the lip 5 of a combustion chamber 4. Limbs 7 on the insert 6 terminate in an annular portion 8 which is located at the sealing ring groove 9. The annular portion 8 is formed during manufacture with recesses 14 and projections 15 extending around the circumference, the recesses 14 being entirely filled with aluminium alloy during the casting process.

Figure 2:
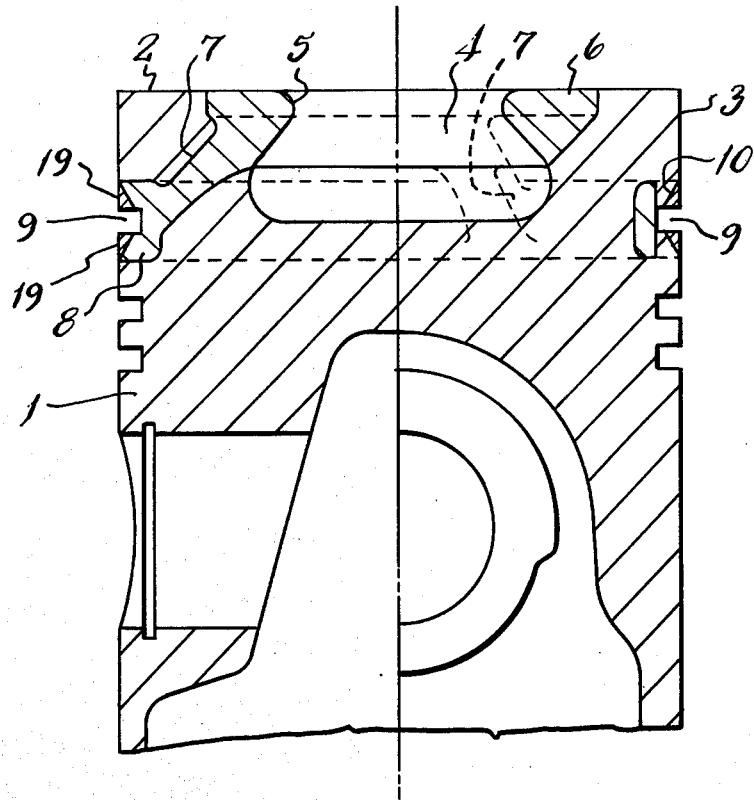
FIG. 2 represents a cross-sectional elevation along planes intersecting at right angles at the axis of a piston made in accordance with the second embodiment.
Figures 3, 4, 5:
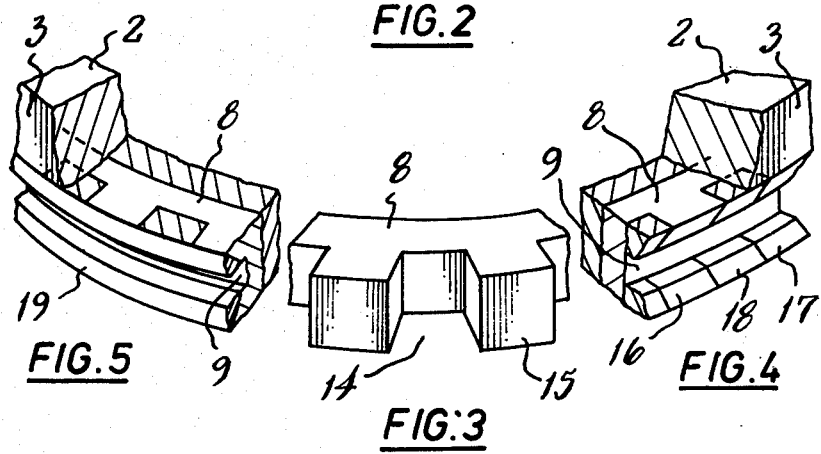
FIG. 3 represents a fragmentary perspective view of the annular portion of an insert prior to embedding in a piston body during the casting operation.
FIG. 4 represents a fragmentary perspective view of a transverse section of a piston at the location of the annular portion of an insert after being embedded in the piston body and after being machined to form a groove and a V-shaped recess.
FIG. 5 represents a fragmentary perspective view of a transverse section of a piston at the location of the annular portion of an insert following the stage shown in FIG. 4 after metal spraying and final machining.

After casting the piston body 1 with insert 6 embedded therein, a shallow V recess 16 and the groove 9 are machined thus exposing alternate faces of nickel cast iron 17 and aluminium alloy 18. The recess 16 is then filled with the desired metal spray to form a band 19 bonded to the alternate faces 17 and 18 and extending circumferentially. FIG. 2 shows on the left hand side the metal band 19 bonded to the insert 8 at one of the projections 15 and on the right hand side the metal band 19 bonded to the aluminium alloy forming the body 1 which fills the recess 14, after final machining of the band 19 and the groove 9 which produces the upper and lower portions designated 19 in FIG. 2.

Although not specifically illustrated, FIGS. 1 and 2 can also be considered in a further embodiment, in that the band 13 of FIG. 1 and the band 19 of FIG. 2 may be deposited on one side only of the groove 9, that is, only the upper and lower portions of the bands 13 or 19 are formed. In consequence, the machined shallow recess 10 is confined to one side of the groove 9.

In a still further embodiment, the annular portion 8 can be located relative to the groove 9 so that a lateral face of the annular portion 8 defines one side of the groove 9.

An advantage of the method according to the invention is that existing piston designs can be adapted to more arduous conditions of service. Another advantage is that the sprayed metal provides armouring of the sealing ring groove.

What I claim is:

1. A piston comprising a piston body of a first metal, a crown in an upper part of said body, a cylindrical wall depending from said crown, a combustion chamber in said crown, an insert of a second metal embedded in said crown and defining a lip overhanging said chamber, said insert including an outer annular portion located in said wall and defining piston ring carrier means, and a circumferentially extending band of a sprayed bonding material selected from the group consisting of a third metal and a cermet, said band being bonded to the outside of said outer annular potion of said insert and to an adjacent portion of said body.

2. A piston according to claim 1 in which said first metal is an aluminium silicon alloy, and said second metal is a ferrous alloy containing 3% carbon, 14% nickel, 7% copper and 3% cobalt.

3. A piston according to claim 2 in which said band of bonding material is stainless steel.

4. A piston according to claim 2 in which said band of bonding material is a mixture of stainless steel and copper.

5. A piston according to claim 1 in which said combustion chamber lip is formed from a copper base alloy selected from the group consisting of copper, 0.5–2.0% beryllium, 2.5% cobalt; copper 2% nickel; and copper 8% aluminium.

6. A piston according to claim 1, said insert comprising an inner ring for forming a combustion chamber lip, said inner ring being of a copper base alloy selected from the group consisting of copper 0.5%–2.0% beryllium 2.5% cobalt; copper 2% nickel; and copper 8% aluminium, said insert further comprising an outer ring of a ferrous alloy containing 3% carbon, 14% nickel, 7% copper and 3% cobalt, radial limbs of said ferrous alloy connecting said inner ring to said outer ring and brazed joints securing said limbs to said inner ring.

7. A piston according to claim 1 wherein said carrier means has a smaller circumference than said cylindrical side wall and said band is positioned between the carrier means and the outside of said cylindrical side wall.

* * * * *